US010737961B2

(12) United States Patent
Rashley et al.

(10) Patent No.: US 10,737,961 B2
(45) Date of Patent: Aug. 11, 2020

(54) HEIGHT ADJUSTMENT AND ALIGNMENT MECHANISM FOR A PLUNGER CYLINDER USED TO FORM A PARISON WITHIN A MOLD OF A GLASS FORMING MACHINE

(71) Applicant: Owens-Brockway Glass Container Inc., Perrysburg, OH (US)

(72) Inventors: Shane T. Rashley, Bowling Green, OH (US); Robin Flynn, Waterville, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 215 days.

(21) Appl. No.: 15/879,241

(22) Filed: Jan. 24, 2018

(65) Prior Publication Data

US 2019/0225527 A1 Jul. 25, 2019

(51) Int. Cl.
*C03B 9/193* (2006.01)
(52) U.S. Cl.
CPC .......... *C03B 9/1932* (2013.01); *C03B 9/1934* (2013.01); *C03B 2215/00* (2013.01)
(58) Field of Classification Search
CPC ..... C03B 9/1932; C03B 9/1934; C03B 9/193; C03B 9/1936; C03B 2215/00
See application file for complete search history.

(56) References Cited

U.S. PATENT DOCUMENTS

| 3,314,775 | A | * | 4/1967 | De Shetler | C03B 9/3825 65/167 |
|---|---|---|---|---|---|
| 3,582,309 | A | | 6/1971 | Bracken | |
| 4,272,273 | A | | 6/1981 | Trahan et al. | |
| 4,551,163 | A | | 11/1985 | Duga et al. | |
| 4,579,572 | A | | 4/1986 | Duga et al. | |
| 5,180,412 | A | | 1/1993 | Tsuchimoto et al. | |
| 5,632,796 | A | | 5/1997 | Kuz et al. | |
| 5,697,996 | A | | 12/1997 | Tsuda | |
| 7,054,710 | B2 | | 5/2006 | Hartmann et al. | |
| 7,168,270 | B2 | | 1/2007 | Leidy et al. | |
| 7,860,588 | B2 | | 12/2010 | Bonitz et al. | |
| 2005/0252245 | A1 | | 11/2005 | Bogert et al. | |
| 2009/0078005 | A1 | | 3/2009 | Kirkman | |
| 2014/0109618 | A1 | | 4/2014 | Kuz et al. | |

OTHER PUBLICATIONS

Int. Search Report and Written Opinion, Int. Serial No. PCT/US2019/013768, Int. Filing Date: Jan. 16, 2019, Applicant: Owens-Brockway Glass Container Inc., dated Mar. 20, 2019.

* cited by examiner

*Primary Examiner* — Queenie S Dehghan

(57) ABSTRACT

An assembly for forming a parison within a mold of a glass forming machine includes a plunger cylinder having a first end configured to be received by the mold and form the parison and a second end. The cylinder is configured for movement along a translational axis. An alignment plate defines a bore through which the cylinder extends. The alignment plate is configured to be affixed to a fixed member of the forming machine after movement of the alignment plate in a plane perpendicular to the translational axis to align the translational axis of the cylinder with a centerline of the mold. A height adjustment plate is spaced from, and hung from, the alignment plate and configured to support the second end of the cylinder. The height adjustment plate is movable relative to the alignment plate to cause a corresponding movement of the cylinder along the translational axis.

20 Claims, 4 Drawing Sheets

HEIGHT ADJUSTMENT AND ALIGNMENT MECHANISM FOR A PLUNGER CYLINDER USED TO FORM A PARISON WITHIN A MOLD OF A GLASS FORMING MACHINE

BACKGROUND a. Technical Field

This disclosure relates to glass forming machines. In particular, the disclosure relates to a mechanism for aligning and adjusting the height of a plunger cylinder used in forming parisons in a mold of a glass forming machine.

b. Background Art

In a "press and blow" glass forming machine, a portion of molten glass, or gob, is inserted into a mold of the glass forming machine. A plunger is then inserted into the mold to press the gob into a shape defined by the mold. The shaped gob is known as a parison. In subsequent operations, the parison is removed from the mold and blown into a final shape.

In order to accurately form the parison, the plunger must be aligned with the mold. In conventional glass forming machines, the plunger cylinder from which the plunger extends is supported on an alignment plate that enables a translational axis of the plunger cylinder to be aligned with a centerline of the mold and on a height adjustment plate that enables the plunger cylinder to be moved towards and away from the mold along the axis. The alignment plate is supported on one member of a frame or section box of the glass forming machine. The height adjustment plate is supported on another member of the frame. In one conventional configuration, a threaded jack screw extends from the height adjustment plate into a foot that is attached to the frame of the glass forming machine. Rotation of a nut disposed about the screw causes the height adjustment plate to move thereby raising or lowering the plunger cylinder.

The conventional arrangement described above has a significant disadvantage. Because the height adjustment plate is attached to the frame of the glass forming machine, movement of the alignment plate when centering the plunger cylinder causes the translational axis of the plunger cylinder to skew relative to the centerline of the mold. This angular misalignment can result in a non-uniform wall thickness in the parison that can create weak spots in the finished product or render the finished product unsuitable for its intended use. Some conventional devices have attempted to address this problem by allowing for limited movement of the height adjustment plate and plunger cylinder proximate the connection of the height adjustment plate to the glass forming machine. In this arrangement, however, the position of the height adjustment plate and plunger cylinder is never fixed and is subject to movement during operating of the glass forming machine which can still result in skewing of the translational axis of the plunger cylinder relative to the centerline of the parison mold.

The inventors herein have recognized a need for an assembly for forming a parison within a mold of a glass forming machine that will minimize and/or eliminate one or more of the above-identified deficiencies.

BRIEF SUMMARY OF THE DISCLOSURE

This disclosure relates to glass forming machines. In particular, the disclosure relates to an assembly for forming a parison within a mold of a glass forming machine that will enable a plunger cylinder of the assembly to be aligned with, and moved towards and away from, the mold while remaining centered relative to the mold.

An assembly for forming a parison within a mold of a glass forming machine in accordance with one embodiment of the present teachings includes a plunger cylinder having a first end configured to be received by the mold and to form the parison and a second end opposite the first end. The plunger cylinder is configured for movement along a translational axis. The assembly further includes an alignment plate defining a bore through which the plunger cylinder extends. The alignment plate is configured to be affixed to a fixed member of the glass forming machine after movement of the alignment plate in a plane perpendicular to the translational axis to align the translational axis of the plunger cylinder with a centerline of the mold. The assembly further includes a height adjustment plate spaced from, and hung from, the alignment plate and configured to support the second end of the plunger cylinder. The height adjustment plate is movable relative to the alignment plate to cause a corresponding movement of the plunger cylinder along the translational axis.

An assembly for forming a parison within a mold of a glass forming machine in accordance with another embodiment of the present teachings includes a plunger cylinder having a first end configured to be received by the mold and to form the parison and a second end opposite the first end. The plunger cylinder is configured for movement along a translational axis. The assembly further includes an alignment plate defining a bore through which the plunger cylinder extends. The alignment plate is configured to be affixed to a fixed member of the glass forming machine after movement of the alignment plate in a plane perpendicular to the translational axis to align the translational axis of the plunger cylinder with a centerline of the mold. The assembly further includes a height adjustment plate spaced from, and hung from, the alignment plate and configured to support the second end of the plunger cylinder. The height adjustment plate is movable relative to the alignment plate to cause a corresponding movement of the plunger cylinder along the translational axis. The assembly further includes a plurality of threaded rods hung from the alignment plate and extending through corresponding bores in the height adjustment plate and a plurality of hub nuts. Each of the plurality of hub nuts is disposed within, and extends through, one of the corresponding bores in the height adjustment plate about a corresponding threaded rod of the plurality of threaded rods and is configured to support the height adjustment plate.

An assembly for forming a parison within a mold of a glass forming machine in accordance with the present teachings is advantageous relative to conventional mechanisms. In particular, the inventive assembly enables alignment of the plunger relative to the mold in three dimensions while preventing the plunger from skewing relative to the centerline of the mold. As a result, the plunger remains centered relative to the mold and forms parisons with a uniform wall thickness. In addition, because the height adjustment plate is not attached to the glass forming machine frame, fluid and lubrication used in operating the plunger cylinder can be more easily routed to the base of the plunger cylinder.

The foregoing and other aspects, features, details, utilities, and advantages of the disclosed system will be apparent from reading the following detailed description and claims, and from reviewing the accompanying drawings illustrating features of this system by way of example.

DETAILED DESCRIPTION

Figure 1:
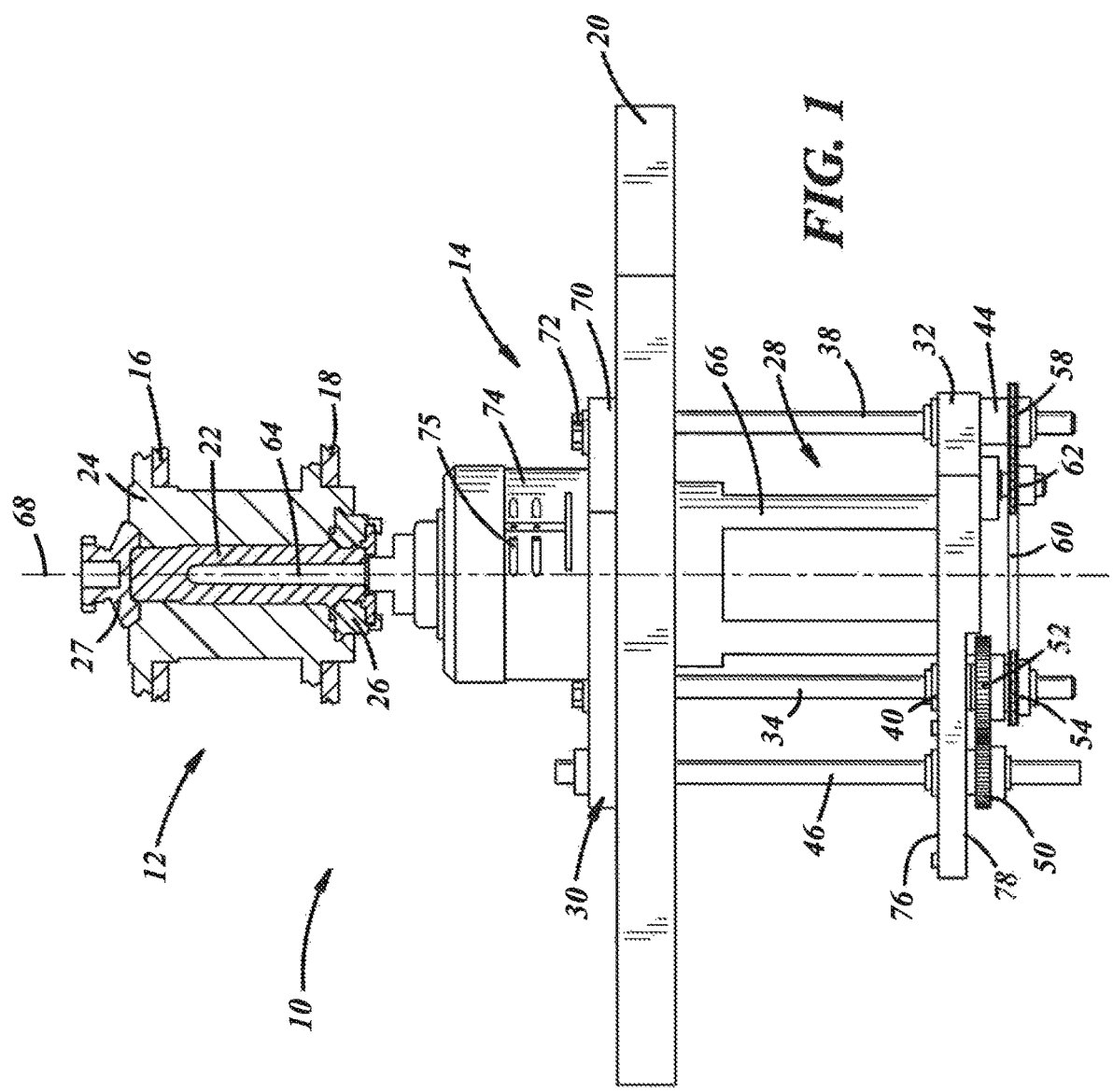
FIG. 1 is a diagrammatic drawing of a portion of a glass forming machine incorporating one embodiment of an assembly for forming a parison within a mold of a glass forming machine.

Referring now to the drawings wherein like reference numerals are used to identify identical components in the various views, FIG. 1 illustrates a portion of a glass forming machine 10 incorporating a mold 12 and an assembly 14 for forming a parison within the mold 12 in accordance with one embodiment of the present teachings. The glass forming machine 10 may comprise a conventional I.S. (individual section) machine. Although glass forming machine 10 includes a single mold 12 and assembly 14 in the illustrated embodiment, it should be understood that glass forming machine 10 may include a plurality of molds 12 and corresponding assemblies 14. The glass forming machine 10 may include a "section box" or frame that provides support to the various components of the machine and orients those components relative to one another. The frame may include several members including arms 16, 18 for supporting mold 12 and member 20 for use in supporting assembly 14 as described below.

Mold 12 defines a cavity 22 for molding or shaping a glass container. In particular, mold 12 is configured to form a parison during a press operation. Mold 12 may include a blank mold 24 and a neck ring mold 26. A gob of molten glass is introduced into cavity 22 in mold 12 through an opening at one end of blank mold 24, after which a baffle 27 may close the opening. A plunger 64 within the plunger cylinder 28 on assembly 14 then advances within mold 12 to press the gob into the shape of mold 12 and form a parison. After the press operation, blank mold 24 may be separated from neck ring mold 26 and neck ring mold 26 moved together with the parison to another station so that the parison may be further formed through one or more blow and finishing operations to form a finished glass container.

Figure 2:
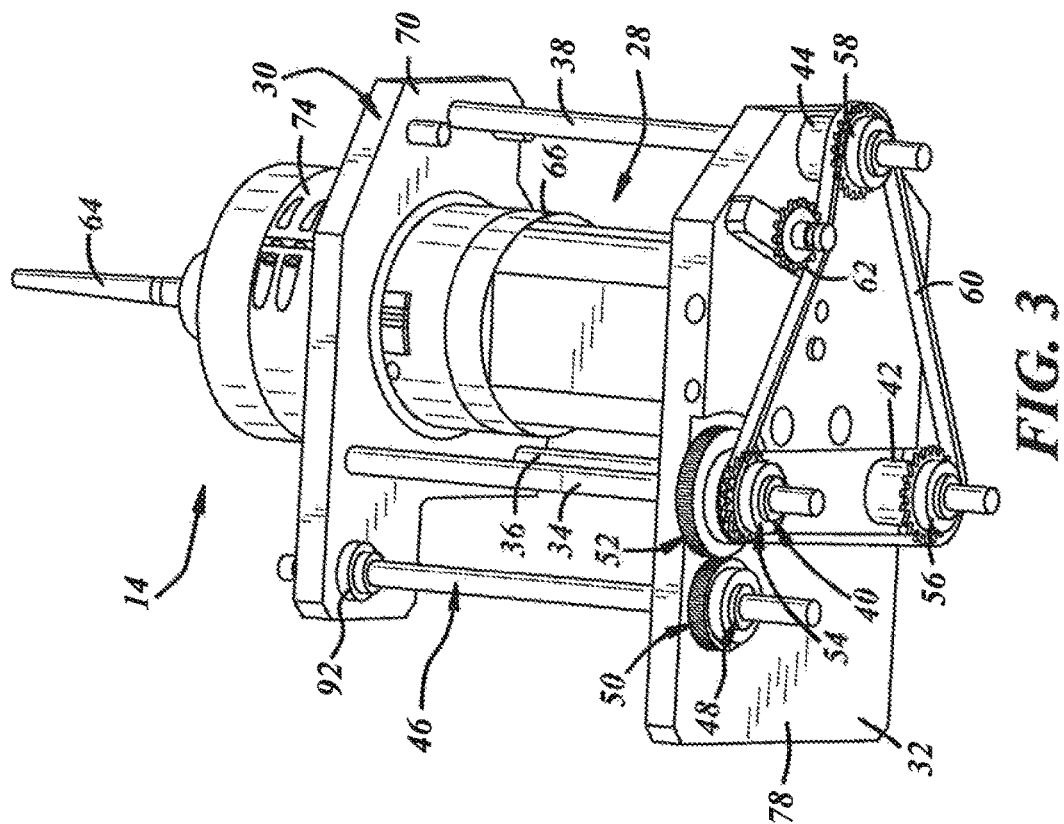
FIG. 2 is a perspective view of the assembly of FIG. 1.
Figure 3:
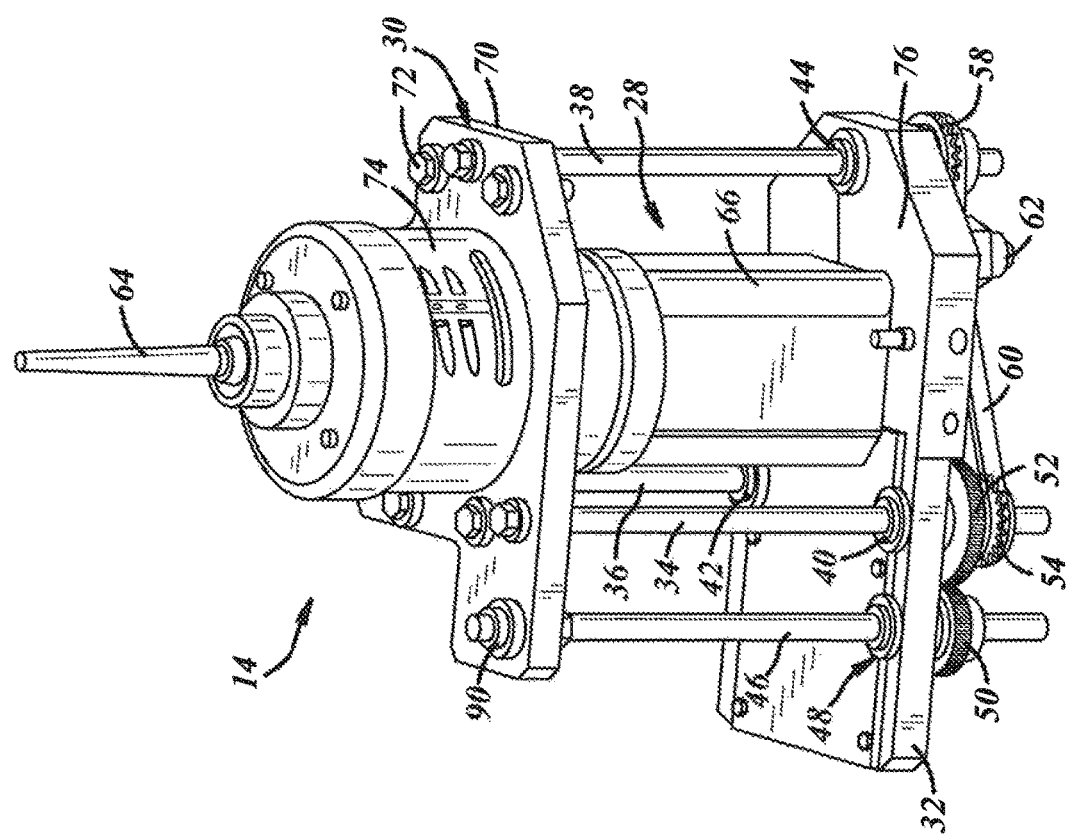
FIG. 3 is a perspective view of the assembly of FIG. 1.
Figure 4:
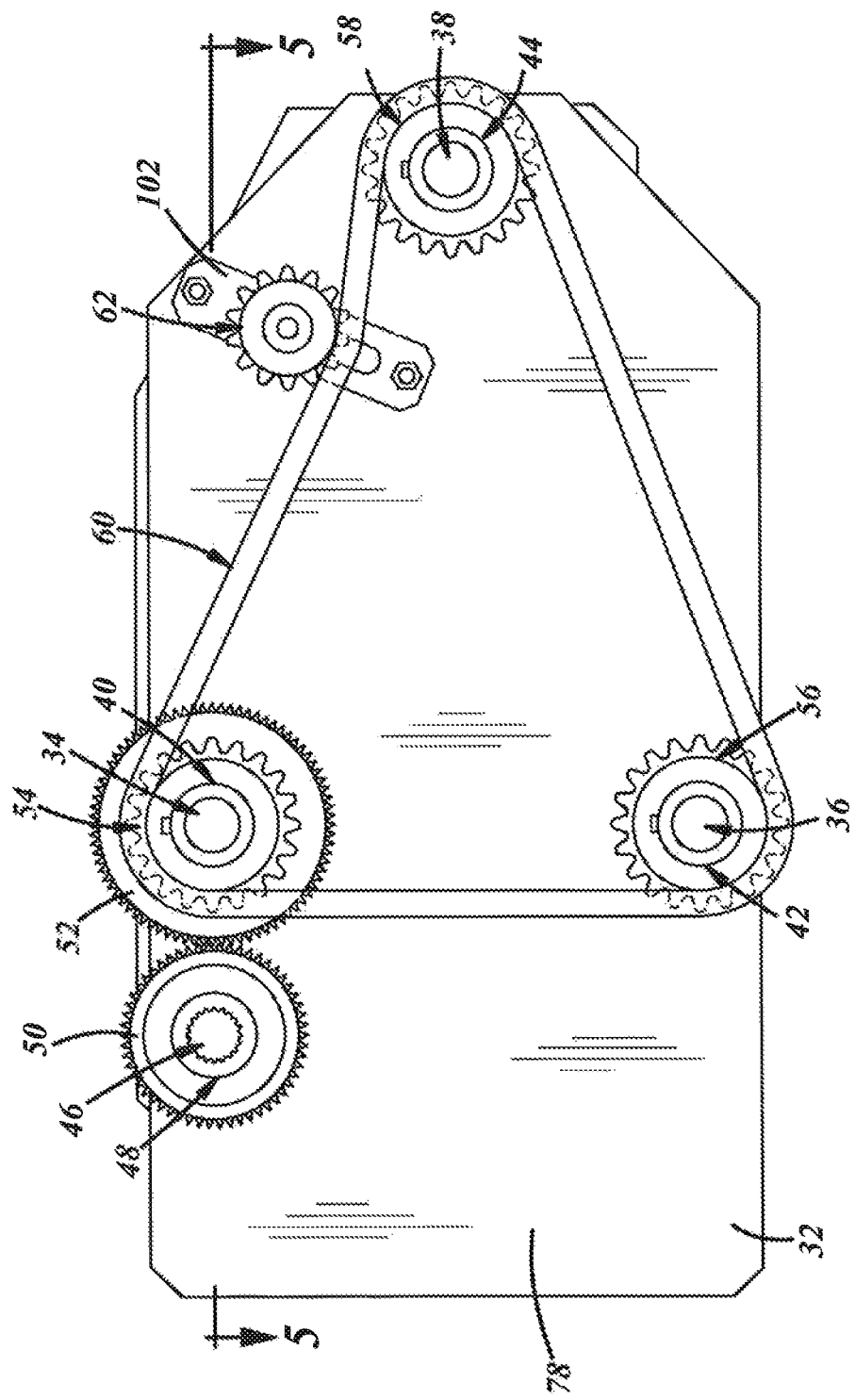
FIG. 4 is a bottom view of the assembly of FIG. 1.

Assembly 14 is provided to form the parison within mold 12 by pressing a gob of molten glass into a shape defined by the surfaces of mold 12. Referring to FIGS. 1-3, assembly 14 may include a plunger cylinder 28, an alignment plate 30, a height adjustment plate 32 and means, such as threaded rods 34, 36, 38, hub nuts 40, 42, 44, spline shaft 46, spline hub 48 (see FIG. 5), gears 50, 52, sprockets 54, 56, 58, and chain 60, for moving height adjustment plate 32 relative to alignment plate 30, and means, such as idler sprocket 62, for tensioning chain 60.

The plunger 64 within the housing 66 of the plunger cylinder 28 is provided to shape the gob of molten glass within mold 12 into a parison. Plunger cylinder 28 is supported on height adjustment plate 32 and extends through a bore in alignment plate 30. One longitudinal end of plunger cylinder 28 supports a plunger 64 configured for insertion into mold 12 to form the parison. An opposite longitudinal end of plunger cylinder 28 is supported on, and affixed to, height adjustment plate 32. Plunger 64 may be supported on a piston (not shown) contained within a housing 66 of plunger cylinder 28. Fluids (pneumatic or hydraulic) may be introduced into housing 66 to move the piston and plunger 64 along a translational axis 68. Alternatively, servo motors may be used to move the piston and plunger 64 along translational axis 68. As discussed in greater detail below, assembly 14 is configured to allow alignment of the translational axis 68 of plunger cylinder 28 and plunger 64 with a centerline of mold 12 such that the translational axis 68 is coincident with the centerline of cavity 22 of mold 12 and to prevent translational axis 68 from becoming skewed relative to the centerline. In accordance with one aspect of the present teachings, the structure of assembly 14 also facilitates fluid communication with plunger cylinder 28 through height adjustment plate 32 by removing the structure found in conventional glass forming machines in which the height adjustment plate is fixed to the frame of the glass forming machine. It should be understood that plunger cylinder 28 and, in particular, the internal structure of plunger cylinder 28 used to control movement of plunger 64 may assume a variety of forms.

Alignment plate 30 is provided to align plunger cylinder 28 with mold 12 and, in particular, to move plunger cylinder 28 within an x-y plane perpendicular to the translational axis 68 of plunger cylinder 28 in order to align translational axis 68 with the centerline of mold 12. Alignment plate 30 includes a generally flat mounting portion 70 that is configured to be affixed to member 20 of glass forming machine 10 after movement of alignment plate 30 in the x-y plane perpendicular to translational axis 68. Mounting portion 70 may be affixed to member 20 using a plurality of fasteners 72 such as bolts or screws. Mounting portion 70 is also configured to receive and support one end of each of threaded rods 34, 36, 38, and spline shaft 46. Alignment plate 30 further includes a substantially cylindrical collar portion 74 extending from mounting portion 70. Portions 70, 74 define aligned bores through which plunger cylinder 28 extends. Collar portion 74 is configured to clamp plunger cylinder 28 in place against movement along translational axis 68 once the height of the plunger cylinder 28 has been set for the job being produced on the glass forming machine 10. Collar portion 74 therefore assumes an unclamped state during which plunger cylinder 28 is free to move along translational axis 68 and a clamped state during which the movement of the plunger cylinder 28 along translational axis 68 is inhibited. Collar portion 74 may include a plurality of slots through which fasteners 75 may be inserted to move portion 74 from an unclamped state to a clamped state.

Height adjustment plate 32 is provided to support plunger cylinder 28 and to move plunger cylinder 28 along translational axis 68. Height adjustment plate 32 is spaced from alignment plate 30 and assembly 14 is configured to permit movement of height adjustment plate 32 towards and away from alignment plate 30 in order to move plunger cylinder 28 along translational axis 68. In accordance with the present teachings, height adjustment plate 32 is hung from, or suspended from, alignment plate 30 by rods 34, 36, 38 and hub nuts 40, 42, 44. Height adjustment plate 32 has a first side 76 facing alignment plate 30 that may be substantially flat and is configured to support one longitudinal end of housing 66 of plunger cylinder 28. Conduits that route fluids and lubricants to and from plunger cylinder 28 may be coupled to an opposite side 78 of height adjustment plate 32 (although it should be understood that the conduits may be coupled to any side of height adjustment plate 32). In accordance with one aspect of present teachings, the configuration of assembly 14 facilitates fluid communication with plunger cylinder 28 by creating additional space on side 78 of height adjustment plate 32 by removing the connecting structure between height adjustment plate 32 and the frame of glass forming machine 10. Height adjustment plate 32 defines a plurality of bores parallel to the translational axis 68 of plunger cylinder 28 through which threaded rods 34, 36, 38 and spline shaft 46 extend for a purpose described in greater detail below.

Figure 5:
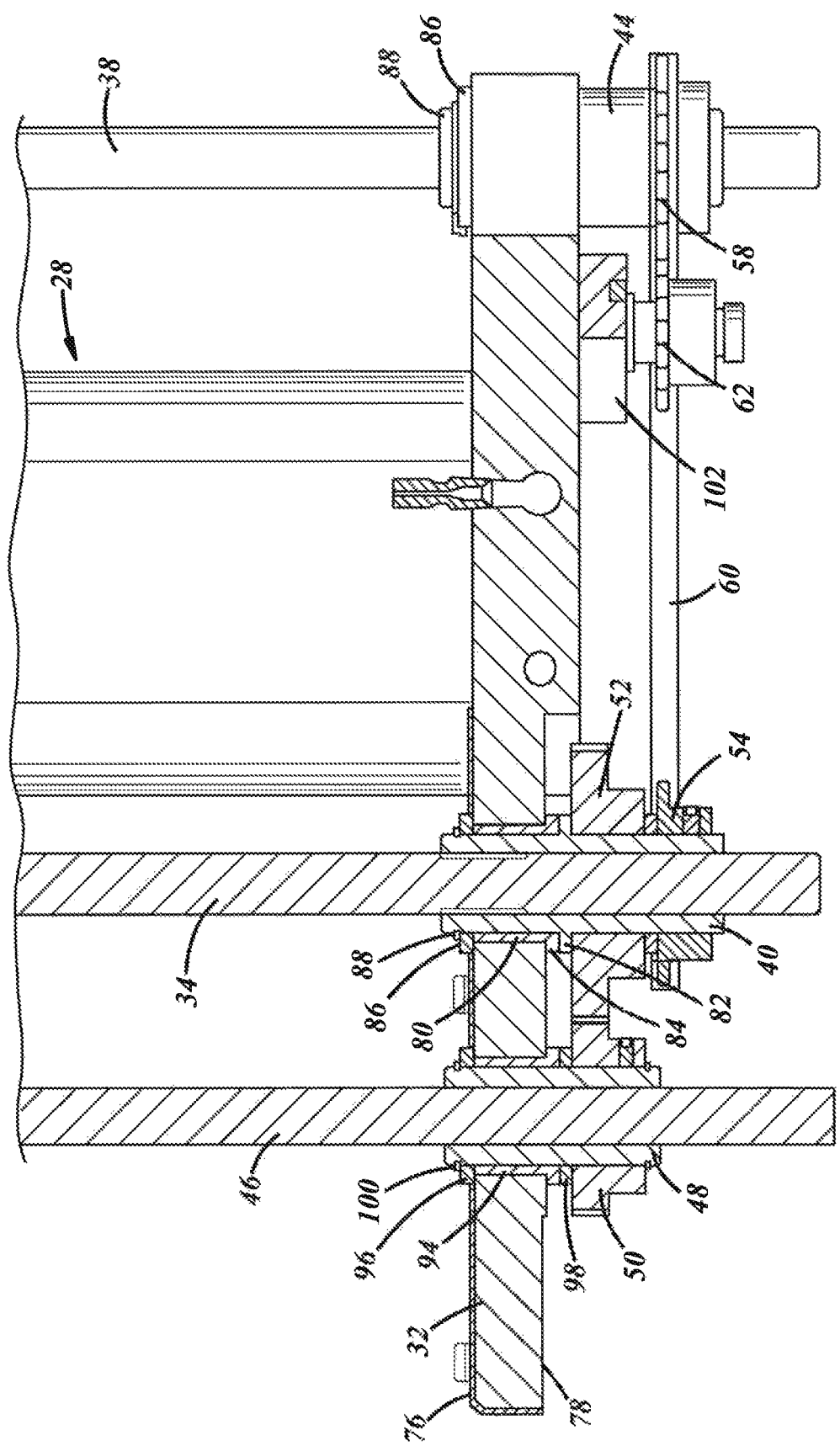
FIG. 5 is a partial cross-sectional view of the assembly of FIG. 1.

Rods 34, 36, 38 and hub nuts 40, 42, 44 are provided to support height adjustment plate 32 such that height adjustment plate 32 is hung from, or suspended from, alignment plate 30 and to enable movement of height adjustment plate 32 towards and away from alignment plate 30 in order to move and position plunger cylinder 28 along translational axis 68. Rods 34, 36, 38 extend through aligned bores in plates 30, 32 and are hung from alignment plate 30. Rods 34, 36, 38 are threaded along a portion or all of the length of the rods 34, 36, 38. Referring to FIGS. 2-3 and 5, hub nuts 40, 42, 44 are disposed about rods 34, 36, 38 and are disposed within, and extend through, bores within height adjustment plate 32. Hub nuts 40, 42, 44 have internal threads configured to mesh with corresponding threads on rods 34, 36, 38 to allow hub nuts 40, 42, 44—and height adjustment plate 32—to move along rods 34, 36, 38. Bushings 80, which may be made, for example, from graphite impregnated bronze, may be disposed within the bores through which rods 34, 36, 38 and hub nuts 40, 42, 44 extend and surround hub nuts 40, 42, 44 to allow hub nuts 40, 42, 44 to rotate within the bores. Each hub nut 40, 42, 44 may define a flange 82 that has a diameter greater than the bore and that is disposed on side 78 of height adjustment plate 32. Flange 82 allows hub nuts 40, 42, 44 to support height adjustment plate 32 and to urge height adjustment plate 32 towards alignment plate 30 as hub nuts 40, 42, 44 are moved along rods 34, 36, 38 towards alignment plate 30. Flange 82 may engage a mating flange 84 formed in bushing 80 and that engages side 78 of height adjustment plate 32. Thrust washers 86 may be disposed on the opposite side 76 of height adjustment plate 32 about hub nuts 40, 42, 44 and retaining rings 88 may be used to maintain the position of washers 86.

Spline shaft 46 and spline hub 48 provide a means for rotating gear 50. Spline shaft 46 connects plates 30, 32 and extends through aligned bores in plates 30, 32. Referring to FIGS. 2-3, spline shaft 46 may be secured against movement in a direction parallel to translational axis 68 by shaft collars 90, 92 disposed on either side of alignment plate 30. Referring again to FIG. 5, spline hub 48 is disposed about spline shaft 46 and is coupled to spline shaft 46 in such a way that spline hub 48 rotates with spline shaft 46, but is free to move along spline shaft 46. Spline hub 48 is disposed within, and extends through, a bore within height adjustment plate 32. A hushing 94, which may be made, for example, from graphite impregnated bronze, is also disposed within the bore and surrounds spline hub 48 to allow spline hub 48 to rotate within the bore. Thrust washers 96, 98 may be disposed at each longitudinal end of hushing 94 and a retaining ring 100 may be used to maintain the position of washer 96.

Gears 50, 52 are provided to transfer torque from spline hub 48 to hub nut 40 and, together with spline shaft 46 and spline hub 48, provides means for rotating hub nut 40. Gear 50 is disposed about spline huh 48 on side 78 of height adjustment plate 32 and is coupled to spline huh 48 for rotation with spline hub 48. Gear 52 is disposed about hub nut 40 on side 78 of height adjustment plate 32 and is coupled to hub nut 40 for rotation with hub nut 40. Gears 50, 52 are coupled tier rotation with spline hub 48 and hub nut 40, respectively, through, for example, one or more keys, set screws or splines. Gear 50 is in mesh with gear 52. Gear 50, together with spline shaft 46 and spline hub 48, provides a means for rotating gear 52 and hub nut 40. Rotation of spline shaft 46 causes corresponding rotation of spline hub 48, gear 50, gear 52, and hub nut 40. Rotation of hub nut 40 causes hub nut 40—and height adjustment plate 32—to move along rod 34 thereby moving plunger cylinder 28 along translational axis 68.

Sprockets 54, 56, 58 and chain 60 are used to transfer torque from hub nut 40 to hub nuts 42, 44 in order to evenly distribute the forces acting on height adjustment plate 32 and maintain the alignment of height adjustment plate 32—and plunger cylinder 28—with translational axis 68. Sprockets 54, 56, 58 are disposed about hub nuts 40, 42, 44 on side 78 of height adjustment plate 32 and are coupled to hub nuts 40, 42, 44 for rotation therewith. Sprockets 54, 56, 58 and hub nuts 40, 42, 44 rotate about axes parallel to translational axis 68. Sprockets 54, 56, 58 may be disposed. In a common plane that is perpendicular to translational axis 68. Each sprocket 54, 56, 58 defines a plurality of radially outwardly extending teeth configured to engage chain 60. Chain 60 extends around sprockets 54, 56, 58 to couple sprockets 54, 56, 58. Rotation imparted to sprocket 54 through rotation of hub nut 40 causes movement of chain 60 which in turn causes rotation of sprockets 56, 58 and hub nuts 42, 44 such that hub nuts 42, 44 move along rods 36, 38 in coordination with the movement of hub nut 40 along rod 34. Although the illustrated embodiment employs sprockets 54, 56, 58 and a chain 60, it will be understood that assembly 14 could alternately employ pulleys and a belt, or another such device, in place of sprockets 54, 56, 58 and chain 60.

Idler sprocket 62 provides a means for tensioning chain 60. Sprocket 62 defines a plurality of radially outwardly extending teeth configured to engage chain 60. Sprocket 62 may be supported on height adjustment plate 32 through a mounting bracket 102 coupled to side 78 of height adjustment plate 32. Bracket 102 may include a slot that allows an axle tier sprocket 62 to assume multiple positions so that the amount of tension in chain 60 can be varied.

An assembly 14 for forming a parison within mold 12 in accordance with the present teachings is advantageous relative to conventional assemblies. In particular, the inventive assembly 14 provides a mechanism through which height adjustment plate 32 is supported by alignment plate 30 as opposed to the frame of glass forming machine 10. As a result, any movement of alignment plate 30 in an x-y plane perpendicular to the centerline of mold 12 to align translational axis 68 with that centerline results in corresponding movement of height adjustment plate 32 and prevents translational axis 68 from skewing relative to the centerline of the mold. This helps to ensure that the wall thickness of the parison is uniform thereby limiting potential weak spots in the parison. In addition, because the height adjustment plate 32 is not attached to the frame of glass forming machine 10, fluid and lubrication used in operating the plunger cylinder 28 can be more easily routed to the base of the plunger cylinder 28.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

What is claimed is:

1. An assembly for forming a parison within a mold of a glass forming machine, comprising:
 a plunger cylinder having a first end configured to be received by the mold and to form the parison and a second end opposite the first end, the plunger cylinder configured for movement along a translational axis;
 an alignment plate defining a bore through which the plunger cylinder extends, the alignment plate configured to be affixed to a fixed member of the glass forming machine after movement of the alignment plate in a plane perpendicular to the translational axis to align the translational axis of the plunger cylinder with a centerline of the mold; and,
 a height adjustment plate spaced from, and hung from, the alignment plate and configured to support the second end of the plunger cylinder, the height adjustment plate movable relative to the alignment plate to cause a corresponding movement of the plunger cylinder along the translational axis.

2. The assembly of claim 1, further comprising means for moving the height adjustment plate relative to the alignment plate.

3. The assembly of claim 1, further comprising:
 a first threaded rod hung from the alignment plate and extending through a first bore in the height adjustment plate; and,
 a first hub nut disposed within the first bore about the first threaded rod and extending through the first bore, the first hub nut configured to support the height adjustment plate.

4. The assembly of claim 3, further comprising means for rotating the first hub nut to move the first hub nut along the first threaded rod, movement of the first hub nut causing corresponding movement of the height adjustment plate relative to the alignment plate and movement of the plunger cylinder along the translational axis.

5. The assembly of claim 3, further comprising:
 a first gear connected to the first hub nut for rotation therewith; and,
 means for rotating the first gear.

6. The assembly of claim 3, further comprising:
 a first gear coupled to the first hub nut for rotation therewith;
 a spline shaft connecting the alignment plate and the height adjustment plate, the spline shaft extending through a second bore in the height adjustment plate;
 a spline hub coupled to the spline shaft and configured for rotation with the spline shaft; and,
 a second gear coupled to the spline hub and configured for rotation with the spline hub, the second gear in mesh with the first gear.

7. The assembly of claim 6 wherein the spline hub is disposed within the second bore and extends through the second bore.

8. The assembly of claim 3, further comprising:
 a second threaded rod hung from the alignment plate and extending through a second bore in the height adjustment plate; and,
 a second hub nut disposed within the second bore about the second threaded rod and extending through the second bore.

9. The assembly of claim 8, further comprising:
 a first sprocket coupled to the first hub nut and configured for rotation with the first hub nut;
 a second sprocket coupled to the second hub nut and configured for rotation with the second hub nut;
 a chain disposed about the first and second sprockets whereby rotation of the first sprocket results in rotation of the second sprocket.

10. The assembly of claim 9, further comprising an idler sprocket supported on the height adjustment plate and configured to engage the chain to tension the chain.

11. The assembly of claim 10 wherein the height adjustment plate is configured to allow the idler sprocket to assume a plurality of positions to vary tension in the chain.

12. The assembly of claim 8, further comprising:
 a third threaded rod hung from the alignment plate and extending through a third bore in the height adjustment plate; and,
 a third hub nut disposed within the third bore about the third threaded rod and extending through the third bore.

13. The assembly of claim 12 further comprising:
 a first sprocket coupled to the first hub nut and configured for rotation with the first hub nut;
 a second sprocket coupled to the second hub nut and configured for rotation with the second hub nut;
 a third sprocket coupled to the third hub nut and configured for rotation with the third hub nut;
 a chain disposed about the first, second and third sprockets whereby rotation of the first sprocket results in rotation of the second and third sprockets.

14. The assembly of claim 13, further comprising an idler sprocket supported on the height adjustment plate and configured to engage the chain to tension the chain.

15. The assembly of claim 14 wherein the height adjustment plate is configured to allow the idler sprocket to assume a plurality of positions to vary tension in the chain.

16. The assembly of claim 1 wherein the alignment plate includes a collar portion defining a portion of the bore in the alignment plate, the collar portion configured to assume an unclamped state during which the plunger is free to move along the translational axis and a clamped state during which the movement of the plunger along the translational axis is inhibited.

17. An assembly for forming a parison within a mold of a glass forming machine, comprising:
 a plunger cylinder having a first end configured to be received by the mold and to form the parison and a second end opposite the first end, the plunger cylinder configured for movement along a translational axis;
 an alignment plate defining a bore through which the plunger cylinder extends, the alignment plate configured to be affixed to a fixed member of the glass forming machine after movement of the alignment plate in a plane perpendicular to the translational axis to align the translational axis of the plunger cylinder with a centerline of the mold;
 a height adjustment plate spaced from, and hung from, the alignment plate and configured to support the second end of the plunger cylinder, the height adjustment plate movable relative to the alignment plate to cause a corresponding movement of the plunger cylinder along the translational axis;
 a plurality of threaded rods hung from the alignment plate and extending through corresponding bores in the height adjustment plate; and,
 a plurality of hub nuts, each of the plurality of hub nuts disposed within, and extending through, one of the corresponding bores in the height adjustment plate about a corresponding threaded rod of the plurality of threaded rods and configured to support the height adjustment plate.

18. The assembly of claim 17, further comprising means for rotating the plurality of hub nuts to move the plurality of hub nuts along the plurality of threaded rods, movement of the plurality of hub nuts causing corresponding movement of the height adjustment plate relative to the alignment plate and movement of the plunger cylinder along the translational axis.

19. The assembly of claim 17, further comprising:
a first gear coupled to one of the plurality of hub nuts for rotation therewith;
a spline shaft connecting the alignment plate and the height adjustment plate, the spline shaft extending through a shaft bore in the height adjustment plate;
a spline hub coupled to the spline shaft and configured for rotation with the spline shaft; and,
a second gear coupled to the spline hub and configured for rotation with the spline hub, the second gear in mesh with the first gear.

20. The assembly of claim 17, further comprising:
a plurality of sprockets, each of the plurality of sprockets coupled to one of the plurality of hub nuts and configured for rotation therewith; and,
a chain disposed about the plurality of sprockets.

\* \* \* \* \*